(12) United States Patent
Bulusu et al.

(10) Patent No.: US 9,703,808 B2
(45) Date of Patent: Jul. 11, 2017

(54) DATA MASKING SETUP

(75) Inventors: Sitarama Narayana Bulusu, Andhra Pradesh (IN); Rupali Kulkarni, Maharashtra (IN); Nikhil Patwardhan, Maharashtra (IN); Ashim Roy, Maharashtra (IN)

(73) Assignee: Tata Consultancy Services Limited (IN)

( * ) Notice: Subject to any disclaimer, the term of this patent is extended or adjusted under 35 U.S.C. 154(b) by 613 days.

(21) Appl. No.: 13/407,203

(22) Filed: Feb. 28, 2012

(65) Prior Publication Data

US 2013/0060820 A1  Mar. 7, 2013

(30) Foreign Application Priority Data

Sep. 1, 2011  (IN) .......................... 2434/MUM/2011

(51) Int. Cl.
*G06F 17/30* (2006.01)
*G06F 21/62* (2013.01)

(52) U.S. Cl.
CPC .. *G06F 17/30289* (2013.01); *G06F 17/30507* (2013.01); *G06F 17/30569* (2013.01); *G06F 21/6227* (2013.01); *G06F 21/6254* (2013.01)

(58) Field of Classification Search
CPC ...................... G06F 21/6227; G06F 17/30289
USPC ......................................................... 707/803
See application file for complete search history.

(56) References Cited

U.S. PATENT DOCUMENTS

| | | | |
|---|---|---|---|
| 2003/0014394 A1* | 1/2003 | Fujiwara ........... | G06F 17/30595 726/1 |
| 2007/0130106 A1* | 6/2007 | Gadiraju ........................ | 707/2 |
| 2008/0133934 A1* | 6/2008 | Gopinath et al. ............. | 713/189 |

OTHER PUBLICATIONS

Oracle, "Oracle Enterprise Manager 10g Data Masking Pack", 2007.*

* cited by examiner

*Primary Examiner* — Mariela Reyes
*Assistant Examiner* — Dawaune Conyers
(74) *Attorney, Agent, or Firm* — Barnes & Thornburg LLP

(57) ABSTRACT

Methods and systems for masking data columns in a database are described herein. The method describes obtaining a masking template. Further the method describes associating the masking template with at least one rule and selecting columns based on the at least one rule. The method further describes identifying at least one column from the selected columns for applying masking setup and initiating masking setup on the at least one column based on the masking template.

12 Claims, 2 Drawing Sheets

DATA MASKING SETUP

CROSS REFERENCE TO RELATED APPLICATION

This application claims priority under 35 U.S.C. §119 to Indian Application No. 2434/MUM/2011, filed on Sep. 1, 2011, the entirety of which is incorporated herein by reference.

TECHNICAL FIELD

The present subject matter, in general, relates to data masking and, in particular, relates to masking setup of data columns in databases.

BACKGROUND

Organizations these days have a huge amount of data related to various aspects of their business, such as employees, business partners, operations, and management, stored in different databases. Databases are organized into tables having rows and columns of data. A table represents a group of related pieces of information. Each piece of information in a table is referred to as a column and each row includes a set of column values.

Data stored in the databases is often used for different purposes, such as testing, training, demonstration, and data research, and may be accessed by people within the organization as well as outside the organization. The databases contain both sensitive and non-sensitive data. Accordingly, care needs to be taken to ensure that at least the sensitive data is inaccessible to unauthorized people, either from within the organization or from outside. A failure to do so may result in the theft of data or unnecessary disclosure of sensitive information. For example, a database used for a bank may include data, such as name, account number, credit card number, debit card number, and address of the customers. In many scenarios, to carry out the day-to-day operations of the bank, the data may be made accessible to certain authorized employees, with access being restricted for other employees. However, in many situations, such as for training and testing purposes, the database may have to be shared with other employees, even if they are not authorized to access the data. This may lead to disclosure of sensitive data.

Conventionally, data masking techniques have been used to protect the data. In data masking techniques, the data which is not to be disclosed to everyone is replaced with dummy data. The dummy data looks like the original data but is not the original data.

SUMMARY

This summary is provided to introduce concepts related to masking setup for data masking, which is further described below in the detailed description. This summary is not intended to identify essential features of the claimed subject matter nor is it intended for use in determining or limiting the scope of the claimed subject matter.

In one implementation, a system and method for masking data columns in a database is described. The method describes obtaining a masking template. The masking template is associated with at least one rule. Based on the at least one rule, columns of the database are selected. The method further describes identifying at least one column from the selected columns for masking setup. Further, the method describes initiating masking setup on the at least one identified column based on the masking template.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
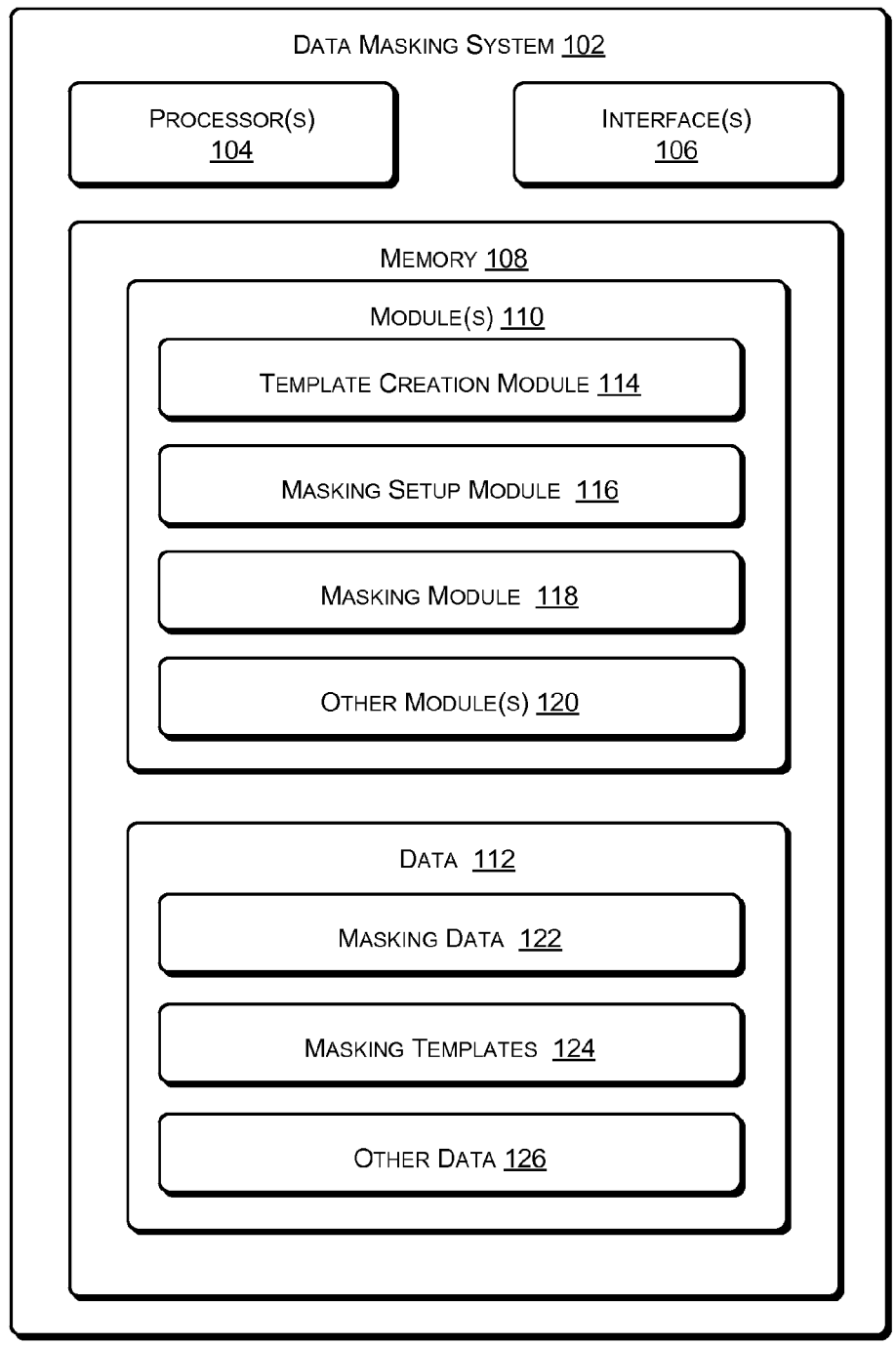
FIG. 1 illustrates a data masking system, in accordance with an embodiment of the present subject matter.

Data stored in databases is often required for different purposes, such as testing, training, demonstration, and data research, and may be accessed by people within the organization as well as outside the organization. The databases include both sensitive and non-sensitive data. Accordingly, care needs to be taken to ensure that at least the sensitive data is inaccessible to unauthorized people either from within or outside the organization.

Conventionally, in order to avoid the unnecessary disclosure of the data stored in the database, which is hereinafter referred to as original data, data masking techniques are used. Data masking techniques help to replace the sensitive data, with dummy data. For example, the customer name in a bank database can be replaced with a coded name or any other fictitious name. With data masking, masked data can be made to look like or behave like the original data, even though it is not the original data. The masked data can therefore be used for different purposes such as training, testing, demonstration and research without the risk of exposing confidential information and theft of the original data.

A typical data masking process includes the following processes: analysis, setup, masking, loading, and validation. In the analysis process, the database is scanned to identify the data columns that need to be masked. Generally, different rules and algorithms can be applied to identify the data columns. After identifying the data columns to be masked, the setup process is initiated. In the setup process, masking properties, such as masking technique and masking data are set for the first identified data column. After initiating masking setup for the first identified data column, the masking setup is set for the second identified data column in a similar manner. The setting of the masking properties for individual columns is carried out until all the identified data columns are setup for masking. For example, if the user needs to mask "customer name", which is present in 600 tables of the database, the user needs to setup masking properties of all the columns in the 600 tables one after the other. Thereafter, all the columns are masked in one go. After masking is completed, the masked data is loaded in the database. Finally, the masked data is validated to check for the presence of data that is not masked and functional correctness of the masked data.

In the conventional method and system described above, the user can apply masking setting to only one column at a time. Since the database contains multiple columns, applying masking setting for one column at a time can be an error prone, tedious and time consuming process. In the above example, if the masking techniques and/or the masking data need to be changed later, the entire process of applying masking setup to 600 columns one by one will have to be repeated.

Embodiments of the present subject matter describe methods and systems for masking setup of data and data masking, including masking of data columns in a database. In one implementation, in order to mask the data columns, interchangeably referred as columns, a masking template is used. In one implementation, the masking template is created by a user. In another implementation, the masking template is selected from a repository of pre-defined masking templates. The masking template may include a template name and one or more properties, such as data length and data type of the columns to which the masking template can be applied, a masking technique to be used and a masking data identifier. The masking template is further associated with one or more rules, based on which columns in the database are selected for masking.

On the selected columns, a masking setup is simulated to identify the columns which can be masked, without an issue, based on the properties of the masking template. Based on the simulation, the selected columns may be categorized in two categories. The first category includes columns on which masking setup can be easily applied and the second category lists the columns which have issue in applying the masking setup. Upon resolving the issue, if any, a final list of columns is identified, which can be setup based on the properties of the masking template. Subsequently, a masking setup is initiated on the identified columns based on the properties specified in the masking template. In the masking setup, the masking properties specified in the masking template are set for each of the identified columns. Thus, the user does not have to individually apply the masking setup to each column. Subsequently, the identified columns are masked based on the properties set for each column in the masking setup.

Consider an example where, in order to mask the customer name columns in a bank database, a masking template is used. The masking template may be created or selected by the user. The masking template for masking the customer names may be named as cust_name, having different properties, such as data length of 5 characters and data type as string type. The desired masking technique can be chosen from different masking techniques, for example, randomization, shuffling, perturbation and user defined replacement, and the masking data identifier can be female English name. The masking data identifier helps to identify a set of related fictitious masking data or dummy data that can be used to mask the original data. In this example, if female English name is the masking data identifier, customer names will be replaced by fictitious female English names.

Further, the masking template is associated with one or more rules. In the above example, the user may define a rule as *name* which is associated with the masking template 'cust_name'. The rule selects the columns in the database which has word 'name' appearing in it, for example, customer name, branch name, and manager name columns may be selected based on the rule. Upon selecting the columns based on the association of the rule with the masking template, the masking setup is simulated on the selected columns to identify the columns on which the masking setup can be initiated without any issue, based on the properties specified in the masking template. On the identified columns, the masking setup is initiated to set the properties of the masking template on each of the identified columns. In the above example, randomization is set as the masking technique and female English name is set as the masking data identifier for each identified column. Subsequently, the masking of the columns take place based on the properties set for each column. In the above example, customer name columns will be replaced by female English names on masking.

In an implementation, one or more masking templates may be defined in accordance with the above defined description and may be stored in a repository of templates, hereinafter referred to as template repository. Such pre-defined templates may be available for future use as part of the template repository.

The method described herein masks the data columns with minimum user intervention. Also, the masking properties can be setup for multiple columns together without having to manually apply the masking setup column by column, as opposed to the conventional methods and systems. This saves a lot of time and efforts of the user and also helps in speeding up the masking process by setting up the masking properties for multiple columns together. Also, if later a change in the masking technique or masking data is required, the user will not be required to change them column by column and has to only change the properties of the masking template and apply the masking template to the database during setup. Also, the users need not be trained for the masking setup. An administrator can create the masking templates and the user can simply apply these masking templates to the chosen database. This way, consistent masking can be achieved for the data in an organization with minimal user intervention.

FIG. 1 illustrates a data masking system 102, in accordance with an embodiment of the present subject matter. In said implementation, the data masking system 102 includes processor(s) 104, interface(s) 106, and a memory 108. The processor 104 may be implemented as one or more microprocessors, microcomputers, microcontrollers, digital signal processors, central processing units, state machines, logic circuitries, and/or any devices that manipulate signals based on operational instructions. The processor 104 is coupled to the memory 108. Among other capabilities, the processor 104 is configured to fetch and execute computer-readable instructions stored in the memory 108.

The interface(s) 106 may include a variety of software and hardware interfaces, for example, a network interface allowing the data masking system 102 to interact with the client devices. Further, the interface(s) 106 may enable the data masking system 102 to communicate with other computing devices, such as web servers and external repositories or databases. The interface(s) 106 can facilitate multiple communications within a wide variety of networks and protocol types, including wired networks, for example LAN, cable, etc., and wireless networks such as WLAN, cellular, or satellite. The interface(s) 106 may include one or more ports for connecting a number of computing devices to each other or to another server.

The memory 108 can include any computer-readable medium known in the art including, for example, volatile memory (e.g., RAM), and/or non-volatile memory (e.g., EPROM, flash memory, etc.). The memory 108 includes modules 110 and data 112. In one implementation, the modules 110 include a template creation module 114, a masking setup module 116, a masking module 118, and other module(s) 120.

The data 112 serves, amongst other things, as a repository for storing data processed, received and generated by one or more of the modules 110. The data 112 includes, for example, masking data 122, masking templates 124, and other data 126. In one implementation, the masking data 122, the masking template 124, and other data 126 may be stored in the memory 108 in the form of data structures.

In accordance with the present subject matter, the data masking system 102 is configured to mask data columns in a database. The data columns are masked using masking templates 124. In one implementation, the template creation module 114 allows a user to create the masking templates 124. In another implementation, the masking templates 124 are selected from a template repository. In such a case, a system administrator may create frequently used masking templates 124 which may be selected by one or more users as per their convenience. In yet another implementation, the masking template 124 created by the user may also be stored in the template repository as masking templates 124.

To create the masking template 124, the template creation module 114 allows the user to provide a template name and define different properties of the masking template 124, such as data length and data type of the columns to which the masking template 124 is to be applied, masking techniques and masking data identifier. Consider an example, in order to mask the customer name columns in a bank database; the user may create a masking template 124 by providing a name to the masking template 124, such as cust_name. Further, different properties may be defined for the masking template 124. For example, data length and data type of the column may be defined as five character and string type respectively. Therefore, the customer name columns which are of string type and having a data length of five or above become eligible for masking using the masking template 124. Further, masking technique, such as randomization, may be defined. In one example, in order to select the masking technique the user may be provided with a drop down list of the masking techniques and the user may select any one of the provided masking techniques. The template creation module 114 may also request the user to select the masking data identifier. The masking data identifier helps in identifying the corresponding masking data 122. The masking data 122 looks like the original data and is used to replace the columns to be masked, to create masked data which looks like the original data but is not the original data. In the above example, the user may select the masking data identifier as female English name to replace the names of the customer with a list of female English names, which look like real customer names but are not the real customer names. The masking data 122 may be selected from a repository of predefined masking data 122, such as names of organizations, names of individuals and random numbers with different number of digits. Thus, using different masking data 122, columns like salary, credit card number, and account balance can be masked. For example, to mask a column of credit card numbers, 16 digit numbers may be selected as the masking data 122. Thus, the masking template 124 is created by defining the various properties of the masking template 124. The masking template so created may be stored in the template repository of predefined masking templates 124 and may be available for use at a later instance.

Subsequently, the masking setup module 116 obtains the masking template 124 either directly from the template creation module 114 or from the template repository in the embodiment where the masking template 124 is stored for use at a later instance. Upon obtaining the masking template 124, the masking setup module 116 associates the masking template 124 with one or more rules. The rules are defined to locate the columns in the database that need to be masked. In the above example, in order to mask the customer name columns in the database, the user may define a rule '*name*'. Upon defining this rule, the masking setup module 116 locates the columns in the database that has the word name appearing in it, such as customer name, branch name, and manager name. In an implementation, more than one rule can be specified for the masking template 124. In the above example, along with the rule *name*, a rule *cust* may also be specified, therefore, the columns which have either the word name or the word customer are located.

In one implementation, the masking setup module 116 may allow the user to select columns for masking from the list of the located columns. In the above example, the masking setup module 116 provides all the columns having customer name, branch name and manager name, and the user may, for example, select to mask only the customer name. In another case, the user may want to mask both the customer name and branch name but may not mask the manager name. In such a case, the user may select the columns having customer name and branch name. In another implementation, the masking setup module 116, without user intervention, selects all the columns selected based on the rules. In the same example as mentioned above, the columns having customer name, the branch name, and the manager name are automatically selected by the masking setup module 116. Thus, the selected columns may be the same as or a subset of the columns located by the masking setup module 116 using the rules associated with the masking template 124.

Further, the masking setup module 116 simulates the masking setup on the selected columns to identify the columns on which masking setup can be applied based on the properties specified in the masking template 124. In order to simulate the masking setup, the masking setup module 116 applies the masking template 124 on the selected columns. The masking setup module 116, in one implementation, categorizes the selected columns into three categories, match, conflict, and error.

A particular column is categorized under the category 'match', if the properties defined in the masking template 124 can be applied to the selected column. In the above example, the masking set module 116 will categorize the customer name columns under the 'match' category if the data type is of string type and the data length is of minimum five characters. The selected columns falling under the match category are identified for masking setup and are referred to as identified columns.

In another implementation, the masking setup module 116 categorizes columns under the 'conflict' category if the column qualifies for more than one masking template, wherein the more than one masking template comprises the masking template 124, currently being used, and one or more other templates stored in the template repository. For example, if the user wants to mask the customer name column, the customer name column may qualify for the masking template 124 to mask the name columns and also for a masking template previously available in the template repository to mask the customer name columns. In case of a conflict, the masking setup module 116 requests the user to select a single masking template 124 based on user preference. The masking setup module 116 may also provide an option to the user to drop the columns having a conflict. The columns which are identified after resolving the conflict issue are also identified for the masking setup.

Further, the masking setup module 116 analyzes the columns which fall under the 'error category'. In one implementation, a column falls under the 'error' category, if the data type or data length of the column does not match with the data column and data type specified in the masking template 124. For example, if the data type and data length specified in the masking template 124 is of 'string' type and having five characters, whereas the columns selected by the masking setup module 116 is of data type 'numeric' having data length of six character the column will be categorized under the 'error' category. In such as case, even if the data length of the selected column matches with the data length specified in the masking template 124, the column will be categorized in 'error' as the data type is different. In case the column falls under the 'error' category, the masking setup module 116 may request the user to either drop the column or define a new masking template 124 by modifying the data length and/or data type to suit the purpose. In another implementation, if a column is a part of referential integrity constraint, it also falls under the 'error' category. In such a case, the selected column is related to some other column and hence cannot be masked as masking will alter the relationship between the columns. For example, if the user desires to mask the column 'account number' which is referring to a different column of a different table, the user cannot mask the column since referential integrity would be violated. In such a situation, the masking setup cannot be applied on that column and will have to be dropped from the list of identified columns to resolve the issue.

Therefore, the columns which are identified under the match category and the columns identified after resolving the issue, in the conflict and error category, qualify for the masking setup. Such columns are hereinafter referred to as identified columns.

Upon identification, the masking setup module 116 initiates the masking setup on the identified columns. Upon initiating the masking setup, the masking setup module 116 sets the masking properties specified in the masking template 124, such as masking technique and masking data identifier, on the identified columns. In the above example, the masking setup module 116 sets the randomization masking technique and female English name as the masking data 122 on each of the identified columns.

Subsequently, the masking module 118 masks the identified columns based on the masking setup, i.e., the properties which were set by the masking setup module 116 on the identified columns are applied on the identified columns. In the above example, customer names will be replaced by female English names.

In an implementation, the data masking system 102 of the present subject matter can also be used for multiple databases. In such a case, a particular masking template 124 may be used on multiple databases, however the rules associated with the masking template 124 may vary from database to database. This, as will be apparent to one skilled in the art, is so because naming convention for naming various columns may be different in different databases.

The data masking system 102, in accordance with the present subject matter thus provides an efficient way of setting up masking properties of multiple columns together by using a single masking template. Masking setup using masking templates requires less user intervention, thus saving valuable time and efforts of the user. This also makes masking setup less error prone. As opposed to conventional system, masking setup of columns using the masking templates is not repetitive and speeds up the data masking process.

The data masking system 102 also has an advantage that the user does not have to define the masking properties. An administrator may create various masking templates 124 using the template creation module 114 and store such masking templates in a template repository, and the user could simply use the stored masking templates.

Further, if the user, at a later point of time, wants to change some of the masking properties, the user would not have to go column by column to change the masking properties. The user would simply change the masking properties defined in the masking template 124 and execute masking setup on the selected columns. In the above example, if the user wants to change the masking data from female English name to male English name, the user simply needs to change the masking template and run the masking setup.

Figure 2:
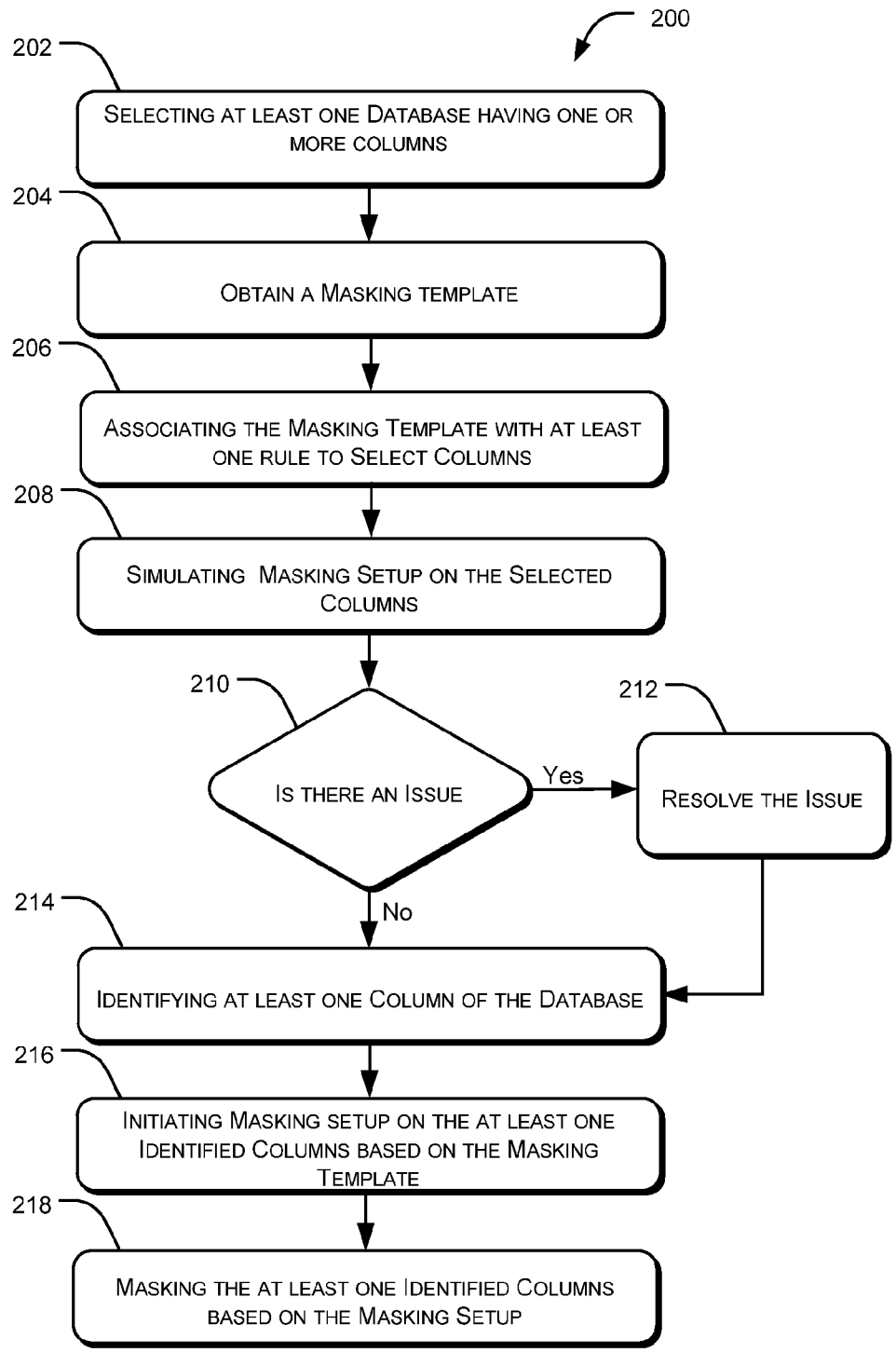
FIG. 2 illustrates a method to mask data columns in a database, in accordance with an embodiment of the present subject matter.

FIG. 2 illustrates a method to mask the data columns in a database, in accordance with an embodiment of the present subject matter. The method 200 may be described in the general context of computer executable instructions. The method 200 may be a computer implementable method. Generally, computer executable instructions can include routines, programs, objects, components, data structures, procedures, modules, functions, and the like that perform particular functions or implement particular abstract data types. The method may also be practiced in a distributed computing environment where functions are performed by remote processing devices that are linked through a communication network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

In accordance with an embodiment of the present subject matter, the method 200 may be implemented in the previously described system 102. However, it will be appreciated by one skilled in the art that such an implementation is not limiting. The method 200 may be implemented in a variety of such similar systems.

At block 202, a database having one or more columns is selected. For example, the data masking system 102 selects a database, for example a bank database having columns like customer name, account number, card number and customer address.

At block 204, a masking template is obtained. In one implementation, the masking template may be created by a user. In another implementation, the masking template may be selected from a template repository of pre-defined masking templates, for example administrator defined masking templates or masking templates previously defined by the user. For example, the user, through a template creation module 114, creates a masking template 124. The masking template 124 may have a template name and one or more properties, such as, data length, data type, masking technique and masking data identifier.

At block 206, the masking template is associated with at least one rule to select columns. For example, through the masking setup module 116, the user associates masking template 124 with at least one rule. In the example of the bank database, in order to mask the customer name columns, the user defines the rule *name*. Based on the rule defined by the user, the masking setup module 116 locates the columns that has word 'name' appearing in it, such as customer name, branch name, and manager name. The located columns are presented to the user. In one implementation, the masking setup module 116 may allow the user to select one or more of the located columns for masking. In another implementation, the masking setup module 116, by default selects all the located columns.

At block 208, masking setup is simulated on the selected columns. For example, the masking setup module 116 simulates the masking setup on the selected columns by applying the masking template 124 on the selected columns, in order to identify the columns on which masking setup can be initiated without an issue.

At block 210, a determination is made as to whether there is an issue in applying the masking template to the selected columns. For example, the masking setup module 116 determines whether there is an issue in applying the masking template 124 to the selected columns. For the purpose, the masking setup module 116 categorizes column under different categories, such as match, conflict and error. In one implementation, if the properties of a particular column match with the properties specified in the masking template 124, that particular column is categorized under 'match' category. In such a case the properties of the masking template can be set on the column without an issue and the column is identified for applying the masking setup. In another implementation, the masking setup module 116 categorizes a column under a 'conflict' category if the column qualifies for more than one masking template. In yet another implementation, the masking setup module 116 may categorize a column under the category 'error'. In one example, the column is categorized under 'error category' if the data length and/or data type specified in the masking template 124 does not match with the data length and/or data type of the selected column. In another example, a column is categorized under 'error' category if the column is a part of the referential integrity constraint. If the selected columns have an issue, that is the 'yes' path of block 210, the control flows to block 212. However, if the selected columns do not have an 'issue', that is the 'no' path of block 210, the control flows to block 214.

At block 212, the issues identified at block 210 are resolved. For example, if the selected columns fall under the conflict or error category, the masking setup module 116 requests the user to resolve the conflict. In an implementation, if a column falls under a 'conflict' category, the user selects a masking template 124 on the basis of priority. In the example of the bank database, suppose the column customer name need to be masked, it may qualify for masking template 124 for column 'name' and also qualifies for the masking template 124 for column 'customer name'. The user may select the masking template 124 for customer name. In another implementation, the column may fall under the error category for the reason that data type and data length of the column to be masked and the data type and data length specified in masking template 124 do not match. In such a scenario, the user may modify the masking template 124 to include these columns in the match category or else may drop these columns for masking. In yet another implementation, if the masking module 118 categorizes a column under the 'error' category for the issue of referential integrity, such columns need to be dropped. After resolving the issue control flows to block 214.

At block 214, at least one column is identified from the selected columns for data masking. For example, the selected columns which fall under the match category, and the columns which are selected after resolving the 'conflict' and 'error' issue are identified for masking setup and are referred to as identified columns.

At block 216, masking setup is initiated for the at least one identified column based on the masking template. For example, the masking setup module 116, sets properties specified in the masking template 124 to the identified columns. In the example of the bank database, masking technique may be set as randomization and masking data identifier may be set as female English name for the identified columns.

At block 218, at least one identified column is masked based on the masking setup. For example, the masking module 118 masks the identified column based on the masking setup initiated at block 216. In the above example of the bank database, the customer name columns will be replaced by female English name using randomization technique.

Although implementations for masking of data have been described in language specific to structural features and/or methods, it is to be understood that the present subject matter (and not appended claims) is not necessarily limited to the specific features or methods described. Rather, the specific features and methods for masking of data are disclosed as embodiments of the present subject matter.

We claim:

1. A data masking system comprising:
   a processor; and
   a memory coupled to the processor, the memory comprising, a masking setup module configured to:
      obtain a masking template having a plurality of masking properties;
      associate the masking template with at least one rule;
      automatically select columns of a database based on the at least one rule, wherein the at least one rule is defined by a user to locate the columns in the database that are to be masked;
      categorize the selected columns of the database into a plurality of categories based on the plurality of masking properties of the masking template, wherein the masking setup module is further configured to simulate a masking setup for the selected columns by comparing the plurality of masking properties of the masking template with the selected columns to check whether the selected columns are maskable based on the plurality of masking properties of the masking template, wherein the plurality of masking properties comprises a data length, a data type, a masking technique, and a masking data identifier and wherein the plurality of categories of the selected column comprises a match category, a conflict category and an error category, wherein a selected column is categorized in the match category in response to the properties of the selected column matching the properties specified in the masking template, wherein a selected column is categorized in the conflict category in response to the selected column qualifying for more than one masking template, wherein the more than one masking template comprises the masking template currently being used, and one or more other templates stored in the template repository, and wherein the selected column is categorized in the error category in response to the data length and/or data type specified in the masking template failing to match with the data length and/or data type of the selected column;
      based on the simulating, identify columns which are maskable using the masking template from the selected columns based on whether columns are categorized in the match category; and initiate the masking setup for the identified columns which are maskable using the masking template, wherein, in initiating the masking setup, the plurality of masking properties of the masking template are set for column masking;

identify columns which have an issue preventing application of the masking template from the selected columns based on whether the columns are categorized in either the conflict category or the error category and receive user input to modify the masking template to make the masking template applicable for masking the identified columns that had the issue.

2. The data masking system as claimed in claim 1, further comprising a masking module configured to mask the identified category columns that are maskable based on the plurality of masking properties of the masking template set in the masking setup.

3. The data masking system as claimed in claim 1, further comprising a template creation module configured to create the masking template based on user inputs for the plurality of masking properties.

4. The data masking system as claimed in claim 1, wherein the masking setup module is configured to select the masking template from a template repository.

5. The data masking system as claimed in claim 1, wherein the masking setup module is configured to drop the identified columns which the masking template is not applicable for masking.

6. A computer implemented method for masking data columns in a database, the method comprising:

obtaining a masking template, wherein the masking template has a plurality of masking properties;

associating the masking template with at least one rule;

automatically selecting columns of a database based on the at least one rule, wherein the at least one rule is defined by a user to locate the columns in the database that are to be masked;

categorizing the selected columns of the database into a plurality of categories based on the plurality of masking properties of the masking template, wherein categorizing the selected columns into the plurality of categories comprises simulating a masking setup for the selected columns, by comparing the plurality of masking properties of the masking template with the selected columns to check whether the selected columns are maskable based on the plurality of masking properties of the masking template, wherein the plurality of masking properties comprises a data length, a data type, a masking technique, and a masking data identifier and wherein the plurality of categories of the selected column comprises a match category, a conflict category and an error category, wherein a selected column is categorized in the match category in response to the properties of the selected column matching the properties specified in the masking template, wherein a selected column is categorized in the conflict category in response to the selected column qualifying for more than one masking template, wherein the more than one masking template comprises the masking template currently being used, and one or more other templates stored in the template repository, and wherein the selected column is categorized in the error category in response to the data length and/or data type specified in the masking template failing to match with the data length and/or data type of the selected column;

based on the simulating, identifying a columns which are maskable using the masking template from the selected columns based on whether columns are categorized in the match category; and initiating the masking setup for the identified columns which are maskable using the masking template, wherein initiating the masking setup comprises setting the plurality of masking properties of the masking template for column masking; and identifying a columns which have an issue preventing application of the masking template from the selected columns based on whether the columns are categorized in either the conflict category or the error category, and receiving user input to modify the masking template to make the masking template applicable for masking the identified columns that had the issue.

7. The computer implemented method as claimed in claim 6, further comprising masking the identified columns that are maskable based on the plurality of masking properties of the masking template sent in the masking setup.

8. The computer implemented method as claimed in claim 6, wherein the masking template is selected from a repository of predefined masking templates.

9. The computer implemented method as claimed in claim 6, wherein masking the selected column includes replacing data in the selected column by masking data to create masked data.

10. A non-transitory computer-readable medium having a set of computer executable instructions that, when executed, perform acts comprising:

obtaining a masking template having a plurality of masking properties;

associating the masking template with at least one rule;

automatically selecting columns of a database based on the at least one rule, wherein the at least one rule is defined by a user to locate the columns in the database that are to be masked;

categorizing the selected columns of the database into a plurality of categories based on the plurality of masking properties of the masking template, wherein categorizing the selected columns into the plurality of categories comprises simulating a masking setup for the selected columns by comparing the plurality of masking properties of the masking template with the selected columns to check whether the selected columns are maskable based on the plurality of masking properties of the masking template, wherein the plurality of masking properties comprises a data length, a data type, a masking technique, and a masking data identifier, and wherein the at least two categories of the selected column comprises a match category, a conflict category and an error category, wherein a selected column is categorized in the match category in response to the properties of the selected column matching the properties specified in the masking template, wherein a selected column is categorized in the conflict category in response to the selected column qualifying for more than one masking template, wherein the more than one masking template comprises the masking template currently being used, and one or more other templates stored in the template repository, and wherein the selected column is categorized in the error category in response to the data length and/or data type specified in the masking template failing to match with the data length and/or data type of the selected column;

based on the simulating, identifying columns that are maskable using the masking template from the selected columns based on whether columns are categorized in the match category;

initiating the masking setup for the identified columns that are maskable using the masking template, wherein initiating the masking setup comprises setting the plurality of masking properties of the masking template; and masking the columns that are maskable using the masking template based on the plurality of masking properties of the masking template set in the masking setup; and identifying columns that have an issue preventing application of the the masking template from the selected columns based on whether the columns are categorized in either the conflict category or the error category and receiving user input to modify the masking template to make the masking template applicable for masking the columns that had the issue.

11. The non-transitory computer-readable medium as claimed in claim 10, wherein the masking comprises replacing data in the maskable columns with masking data to create masked data.

12. The non-transitory computer-readable medium as claimed in claim 10, wherein the masking template is selected from a repository of predefined masking templates.

* * * * *